(12) United States Patent
Daneshkhah et al.

(10) Patent No.: US 11,549,513 B2
(45) Date of Patent: Jan. 10, 2023

(54) COMPRESSOR

(71) Applicant: Dyson Technology Limited, Wiltshire (GB)

(72) Inventors: Kasra Daneshkhah, West Molesey (GB); Mark Andrew Johnson, Bath (GB)

(73) Assignee: Dyson Technology Limited, Malmesbury (GB)

( * ) Notice: Subject to any disclaimer, the term of this patent is extended or adjusted under 35 U.S.C. 154(b) by 178 days.

(21) Appl. No.: 16/011,966

(22) Filed: Jun. 19, 2018

(65) Prior Publication Data

US 2018/0363664 A1 Dec. 20, 2018

(30) Foreign Application Priority Data

Jun. 20, 2017 (GB) .................................... 1709862

(51) Int. Cl.
*F04D 25/06* (2006.01)
*F04D 25/08* (2006.01)
(Continued)

(52) U.S. Cl.
CPC ......... *F04D 25/082* (2013.01); *F04D 25/026* (2013.01); *F04D 25/06* (2013.01);
(Continued)

(58) Field of Classification Search
CPC ............. F04D 29/5806; F04D 29/5813; F04D 19/00–048; F04D 25/0646;
(Continued)

(56) References Cited

U.S. PATENT DOCUMENTS 2,726,807 A * 12/1955 Lewis ................... A47L 7/0038
415/119
3,177,731 A * 4/1965 Peterson ................... B06B 1/16
74/87

(Continued)

FOREIGN PATENT DOCUMENTS

CN 101305510 11/2008
CN 101675249 A 3/2010
(Continued)

OTHER PUBLICATIONS

Notification of Reason for Rejection dated Jun. 3, 2019, directed to JP Application No. 2018-116288; 6 pages.
(Continued)

*Primary Examiner* — Thomas Fink
(74) *Attorney, Agent, or Firm* — Faegre Drinker Biddle & Reath LLP

(57) ABSTRACT

A compressor comprising: a stator assembly comprising a plurality of stator elements; a rotor assembly comprising a shaft to which is mounted at least one bearing, a permanent magnet and an impeller; a support body; and an outer can comprising an air inlet. The support body comprises a hollow elongate central part to which is mounted the at least one bearing, and inside which the magnet is positioned, the elongate central part comprising a plurality of openings, and the air inlet of the outer can is axially aligned at least partially with the plurality of openings in the elongate central part.

7 Claims, 3 Drawing Sheets

(51) Int. Cl.
| | | |
|---|---|---|
| *F04D 29/58* | (2006.01) | |
| *H02K 9/06* | (2006.01) | |
| *F04D 25/02* | (2006.01) | |
| *H02K 1/2733* | (2022.01) | |
| *H02K 11/33* | (2016.01) | |
| *H02K 1/14* | (2006.01) | |
| *F04D 19/00* | (2006.01) | |
| *F04D 29/52* | (2006.01) | |
| *F04D 29/26* | (2006.01) | |

(52) U.S. Cl.
CPC ......... *F04D 29/582* (2013.01); *F04D 29/584* (2013.01); *F04D 29/5806* (2013.01); *H02K 9/06* (2013.01); *F04D 19/002* (2013.01); *F04D 25/0646* (2013.01); *F04D 29/266* (2013.01); *F04D 29/522* (2013.01); *F05D 2240/14* (2013.01); *F05D 2250/51* (2013.01); *F05D 2260/20* (2013.01); *H02K 1/148* (2013.01); *H02K 1/2733* (2013.01); *H02K 11/33* (2016.01); *H02K 2211/03* (2013.01)

(58) Field of Classification Search
CPC .... F04D 25/0633; F04D 25/08; F04D 25/082; F04D 29/403; F04D 29/582; F04D 29/584; F04D 29/522; H02K 9/00–28; H02K 1/18; H02K 1/148; H02K 3/521; H02K 3/52; H02K 3/46–487; H02K 9/06; F05D 2240/14; F05D 2250/51; F05D 2260/20
See application file for complete search history.

(56) References Cited

U.S. PATENT DOCUMENTS

| | | | | |
|---|---|---|---|---|
| 3,440,592 A * | 4/1969 | Edgar | ............. | H02K 5/225 310/71 |
| 3,701,911 A * | 10/1972 | Hallerback | ............. | H02K 5/15 310/60 R |
| 3,807,040 A * | 4/1974 | Otto | ............. | H02K 1/185 29/596 |
| 4,429,242 A * | 1/1984 | Layh | ............. | H02K 7/20 310/71 |
| 4,801,831 A * | 1/1989 | Lewis | ............. | H02K 1/185 310/89 |
| 5,075,585 A * | 12/1991 | Teruyama | ............. | H02K 5/15 310/43 |
| 5,238,336 A * | 8/1993 | Sanders | ............. | B23B 47/288 408/112 |
| 5,610,461 A * | 3/1997 | Dohogne | ............. | H02K 5/15 310/89 |
| 5,904,471 A * | 5/1999 | Woollenweber | ............. | F02B 37/16 417/307 |
| 6,104,111 A | 8/2000 | Pullen et al. | | |
| 7,375,447 B2 | 5/2008 | Oomori et al. | | |
| 8,638,014 B2 * | 1/2014 | Sears | ............. | H02K 9/14 310/90 |
| 2007/0228847 A1* | 10/2007 | Kim | ............. | H02K 1/32 310/61 |
| 2009/0246013 A1* | 10/2009 | Kenyon | ............. | F04D 29/444 415/208.2 |
| 2009/0261667 A1 | 10/2009 | Matsubara et al. | | |
| 2010/0239441 A1 | 9/2010 | Bade et al. | | |
| 2011/0068661 A1* | 3/2011 | Clendenen | ............. | H02K 11/33 310/68 D |
| 2012/0128512 A1* | 5/2012 | Vande Sande | ............. | H02K 9/06 417/410.1 |
| 2012/0237373 A1* | 9/2012 | Li | ............. | F04D 25/0606 417/410.1 |
| 2013/0052051 A1* | 2/2013 | Clothier | ............. | F04D 29/5806 417/366 |
| 2013/0091815 A1 | 4/2013 | Smith | | |
| 2013/0307455 A1* | 11/2013 | Akatsu | ............. | H02K 3/28 318/441 |
| 2014/0328674 A1* | 11/2014 | Jacob | ............. | F04D 29/059 415/177 |
| 2014/0328683 A1 | 11/2014 | King et al. | | |
| 2015/0211548 A1* | 7/2015 | Bang | ............. | F04D 29/4253 29/598 |
| 2016/0204676 A1* | 7/2016 | Ziegler | ............. | H02K 9/02 392/379 |
| 2016/0238030 A1* | 8/2016 | Chou | ............. | F04D 25/082 |
| 2016/0298648 A1 | 10/2016 | Graham et al. | | |
| 2017/0110938 A1* | 4/2017 | Chou | ............. | H02K 9/14 |
| 2018/0100517 A1* | 4/2018 | Sawada | ............. | A47L 9/00 |
| 2018/0226858 A1* | 8/2018 | Mas | ............. | H02K 9/06 |
| 2019/0165651 A1* | 5/2019 | Kishi | ............. | H02K 9/22 |
| 2020/0059133 A1* | 2/2020 | Okubo | ............. | H02K 7/14 |
| 2020/0112224 A1* | 4/2020 | Okubo | ............. | H02K 5/20 |
| 2020/0195091 A1* | 6/2020 | Kim | ............. | F04D 29/162 |
| 2021/0050762 A1* | 2/2021 | Tsuchida | ............. | A47L 5/22 |

FOREIGN PATENT DOCUMENTS

| | | |
|---|---|---|
| CN | 103040409 | 4/2013 |
| CN | 103580421 | 2/2014 |
| CN | 104274126 | 1/2015 |
| CN | 106451832 A | 2/2017 |
| CN | 205960853 | 2/2017 |
| CN | 205960857 | 2/2017 |
| CN | 208651210 U | 3/2019 |
| DE | 3710622 | 10/1988 |
| DE | 102015110624 A1 | 1/2017 |
| EP | 2247838 | 7/2009 |
| EP | 2 581 009 | 4/2013 |
| EP | 2733326 | 5/2014 |
| FR | 2 764 747 | 9/1999 |
| GB | 2513663 | 11/2014 |
| JP | 2002-272061 | 9/2002 |
| JP | 2006-230155 | 8/2006 |
| JP | 2011-509375 | 3/2011 |
| JP | 2013-46569 | 3/2013 |
| JP | 2014-219006 | 11/2014 |
| WO | 98/30790 | 7/1998 |
| WO | 2009/087274 | 7/2009 |
| WO | 2016/174790 | 11/2016 |
| WO | 2016/207544 A1 | 12/2016 |

OTHER PUBLICATIONS

Office Action dated Feb. 12, 2019, directed to TW Application No. 107120675; 8 pages.
International Search Report and Written Opinion dated Jul. 10, 2018, directed to International Application No. PCT/GB2018/051135; 12 pages.
Search Report dated Nov. 22, 2017, directed to GB Application No. 1709862.5; 1 page.
Notification of Reason for Refusal dated Nov. 20, 2020, directed to KR Application No. 10-2020-7000869; 8 pages.
The First Office Action dated Sep. 29, 2019, directed to CN Application No. 201810580233.1; 13 pages.
The Third Office Action dated Dec. 8, 2020, directed to CN Application No. 201810580233.1; 16 pages.
Office Action received for European Application No. 18722183.3, dated Feb. 4, 2022, 9 pages.

* cited by examiner

COMPRESSOR

REFERENCE TO RELATED APPLICATIONS

This application claims the priority of United Kingdom No. 1709862.5, filed Jun. 20, 2017, the entire contents of which are incorporated herein by reference.

FIELD OF THE INVENTION

The present invention relates to a compressor.

BACKGROUND OF THE INVENTION

One of the biggest challenges faced with electric motors is keeping the components of the electric motor cool during use. In the case of compressors, the airflow generated by the compressor can be utilised to cool some of the components of the motor. However, it is often the case that the airflow through the compressor is restricted, and is not able to flow past all the components effectively. Therefore the efficiency and performance of the compressor may be limited by the restricted cooling available to a small number of the components.

There is a general desire to improve compressors, such as the motors found in vacuum cleaners, in a number of ways. In particular, improvements may be desired in terms of size, weight, manufacturing cost, performance, efficiency, reliability and noise.

SUMMARY OF THE INVENTION

This invention provides a compressor comprising: a stator assembly comprising a plurality of stator elements; a rotor assembly comprising a shaft to which is mounted at least one bearing, a permanent magnet and an impeller; a support body; and an outer can comprising an air inlet. The support body comprises a hollow elongate central part to which is mounted the at least one bearing, and inside which the magnet is positioned, the elongate central part comprising a plurality of openings, and the air inlet of the outer can is axially aligned at least partially with the plurality of openings in the elongate central part.

As a result, airflow generated by the compressor during use is able to flow into the compressor through the air inlet of the outer can and through the opening of the elongate central part of the support body to cool the magnet during use. Accordingly, more of the components of the compressor can be cooled effectively, and the performance and efficiency of the compressor can be improved.

The air inlet may comprise at least one large opening such that air enters the compressor in a direction having both axial and radial components. As such, cooling airflow is better able to enter the compressor in a way that provides cooling to all internal components of the compressor, both inside the elongate central part of the support body, and outside.

The outer can may be spaced radially from the support body to form an annular airflow pathway. As a result, cooling airflow can pass through the annular pathway to cool components positioned within the annular airflow pathway in addition to the airflow flowing through the elongate central part of the support body.

The stator elements may extend partially through the plurality of openings, and are fixed to the support body such that they extend into the annular airflow pathway. As a result the stator elements can be cooled by both the airflow inside the elongate central part of the support body, and also the annular airflow pathway between the support body and the outer can. This provides all-round cooling for windings wound around the stator elements. As a result, the windings can be kept cooler, and the performance and efficiency of the compressor is improved.

A printed circuit board may be mounted to an end of the outer can proximate the air inlet. Larger electronic components may be mounted to the printed circuit board extend from the PCB into an air pathway for air entering the compressor through the air inlet. As a result, electrical components on the PCB, and in particular the larger components, are cooled by the airflow into the compressor during use. This may further improve the performance and efficiency of the compressor.

In use, air may flow axially through the compressor both inside the support body, and outside the support body.

BRIEF DESCRIPTION OF THE DRAWINGS

In order that the present invention may be more readily understood, embodiments of the invention will now be described, by way of example, with reference to the following accompanying drawings, in which.

DETAILED DESCRIPTION OF THE INVENTION

Figure 1:
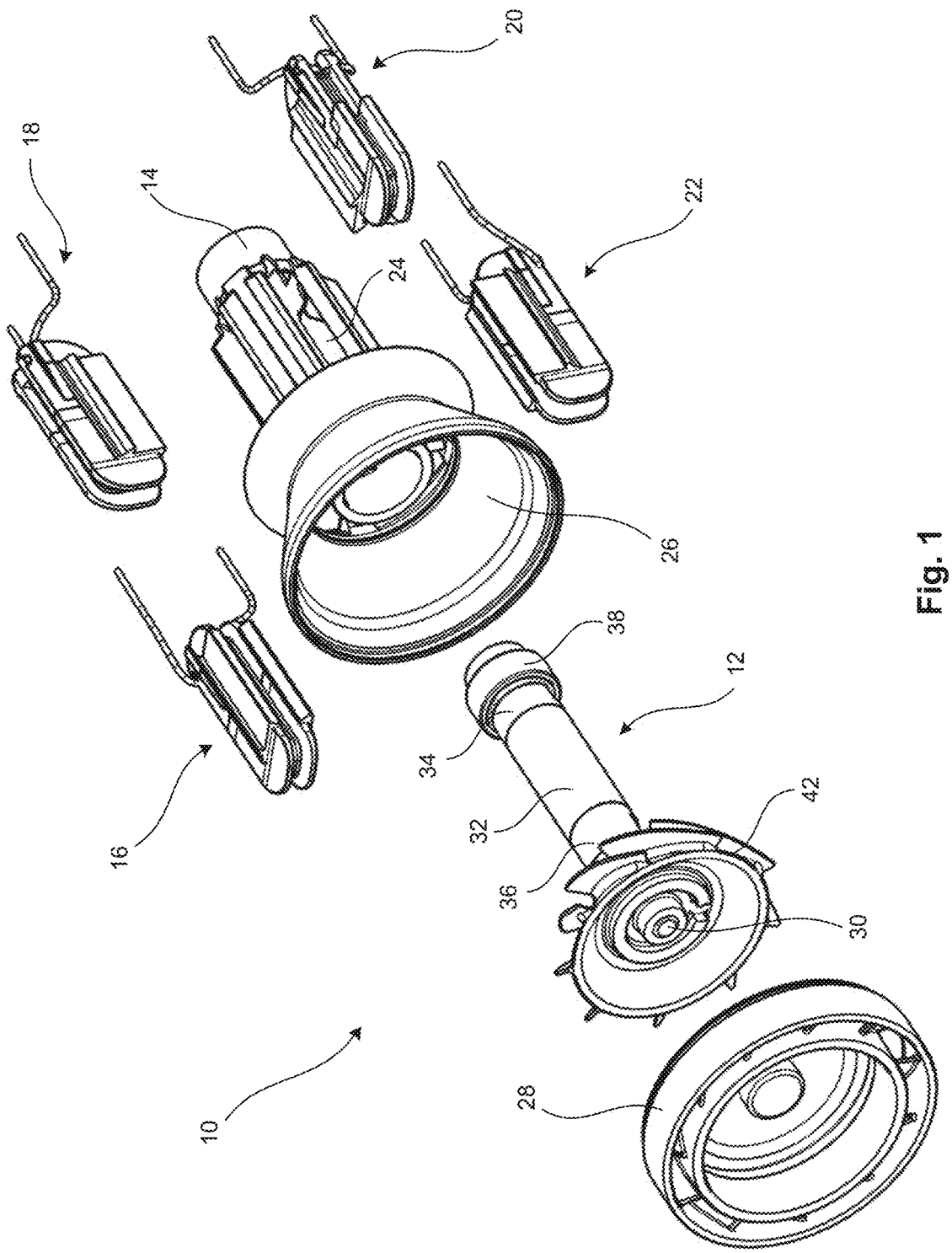
FIG. 1 shows an exploded perspective view of parts of a compressor.

FIG. 1 shows an exploded perspective view of a compressor 10. Certain components, such as control electronics and an external housing, are not shown for clarity. The compressor 10 includes a rotor assembly 12, a support body 14 and a stator assembly comprising four stator elements 16, 18, 20 and 22. When the compressor 10 is assembled, the rotor assembly 12 is located within and mounted to the support body 14, and the stator elements are located in respective openings or slots in the support body 14. For example, the stator element 20 is located within opening 24 in the support body. The support body 14 may be a one-piece construction, for example moulded as a single object, and includes an impeller shroud 26 that covers the impeller. The compressor 10 also includes a diffuser 28.

The rotor assembly 12 comprises a shaft 30 on which is mounted a magnet 32, a first balancing ring 34 and a second balancing ring 36. When the rotor assembly 12 is assembled, a pair of bearings are mounted on the shaft 30 on either side of the core 32 and balancing rings 34, 36. In FIG. 1, only one of the pair of bearings is visible: bearing 38. An impeller 42 is mounted at one end of the shaft 30.

When the stator elements 16, 18, 20 and 22 are located in respective openings in the support body 14, at least a portion of the opening is still open, and not restricted by the stator element. This allows an airflow to pass the stator element, through the opening, and into the support body. When the compressor is in use, this airflow can be used to cool the rotor assembly 12 located inside the support body 14, and in particular the magnet 32.

Figure 2:
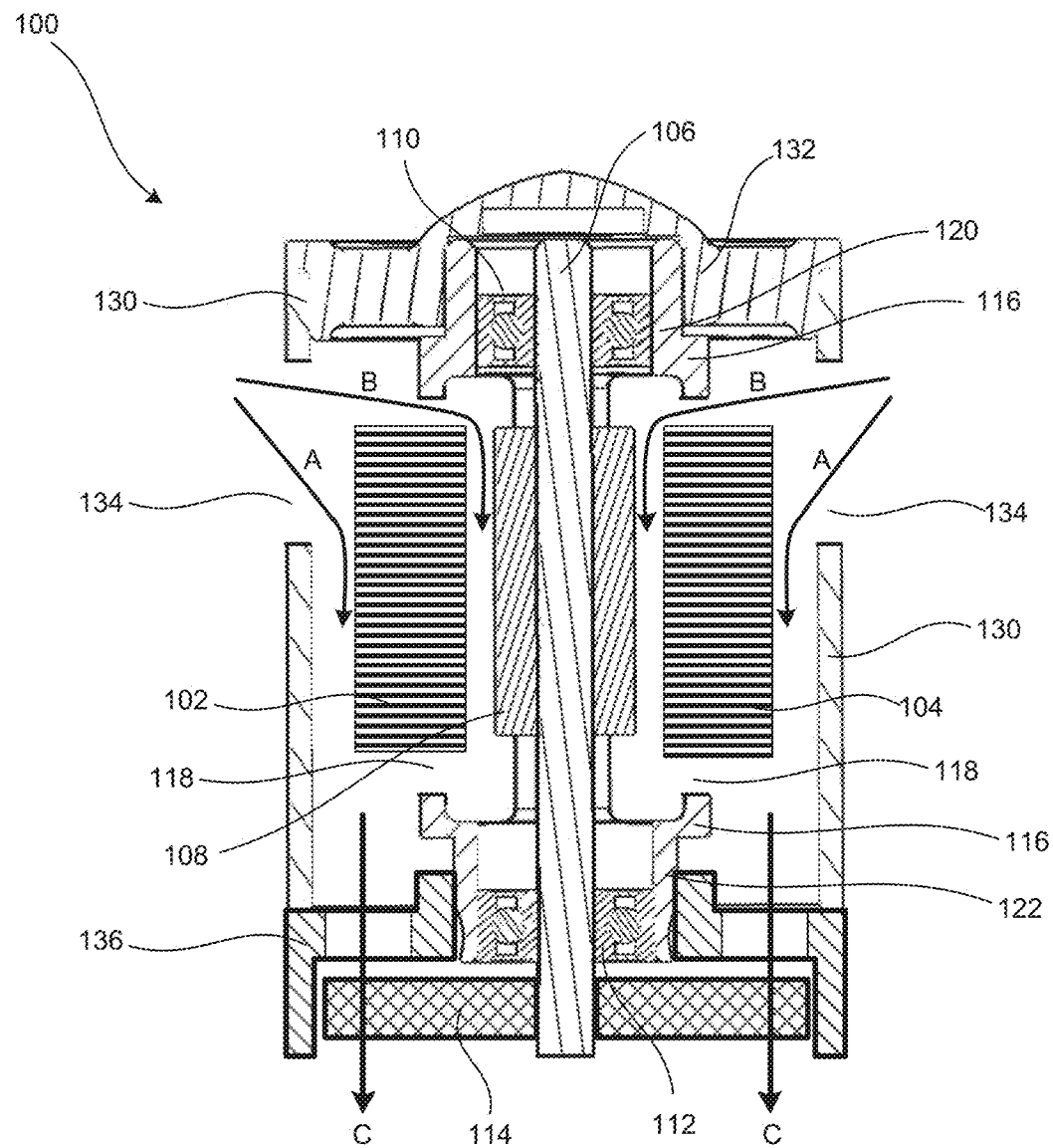
FIG. 2 shows a cross section through a compressor.

FIG. 2 shows a cross section through a compressor 100. The compressor 100 comprises a stator assembly having a number of stator elements 102, 104. A rotor assembly is also provided which comprises a shaft 106 to which is mounted a magnet 108, first and second bearings 110, 112 mounted to the shaft 106 at either end of the magnet 108, and an impeller 114. A support body 116 comprising a hollow elongate central part is provided. A number of openings 118 are provided in the hollow elongate body, through which the stator elements 102, 104 partially extend. The rotor assembly is housed within the support body 116, and the bearings 110, 112 are mounted to bearings seats 120, 122 formed as part of the support body 116 at each end of the openings 118. The magnet 108, being between the bearings, therefore is located within the elongate central part of the support body 116, and aligns with the stator elements 102, 104.

An outer can 130 is positioned around the outside of the compressor 100. It is supported by the support body 116 by being mounted via hub 132 to the outside surface of the bearing seat 120. An air inlet 134 is provided in the outer can 130 to allow air to be drawn in by the compressor 100 during use. Mounted to the outer surface of the other bearing seat 122 is a shroud 136 which surrounds the impeller 114. The outer casing 130 is also mounted to shroud 136. Air passages 138 are provided around or through the shroud 136 to allow air to be drawn through the compressor 100 by the impeller 114. The hub 132 also acts as a winding termination block to which windings of the stator elements 102, 104 can be connected in order to receive current.

As can be seen from FIG. 2, the air inlet 134 of the outer can 130 is axially aligned with the openings 118 in the support body 116. This encourages air flowing into the compressor 100 to flow into the support body 116 to help cool the magnet 108 positioned therein during use. Indeed, the inlet 134 is relatively large, which encourages air flowing into the compressor in a direction that has both radial and axial components. This allows for a cooling airflow through the compressor 100 as indicated by arrows A and B. Cooling airflow A passes through an annular channel between the support body 116 and the outer can 130. Cooling airflow B passes into the support body, and passes between the magnet 108 and the support body 116. Because the stator elements 102, 104 extend partially through the openings 118, the windings on the stator elements are cooled by both airflows on both the inside and the outside of the support body 116.

After passing the stator elements 102, 104, airflow B passes back out of the support body 116 and rejoins airflow A. The combined airflows are then drawn past the shroud 136 by the impeller 114, and out of the compressor 100 as airflow C.

Figure 3:
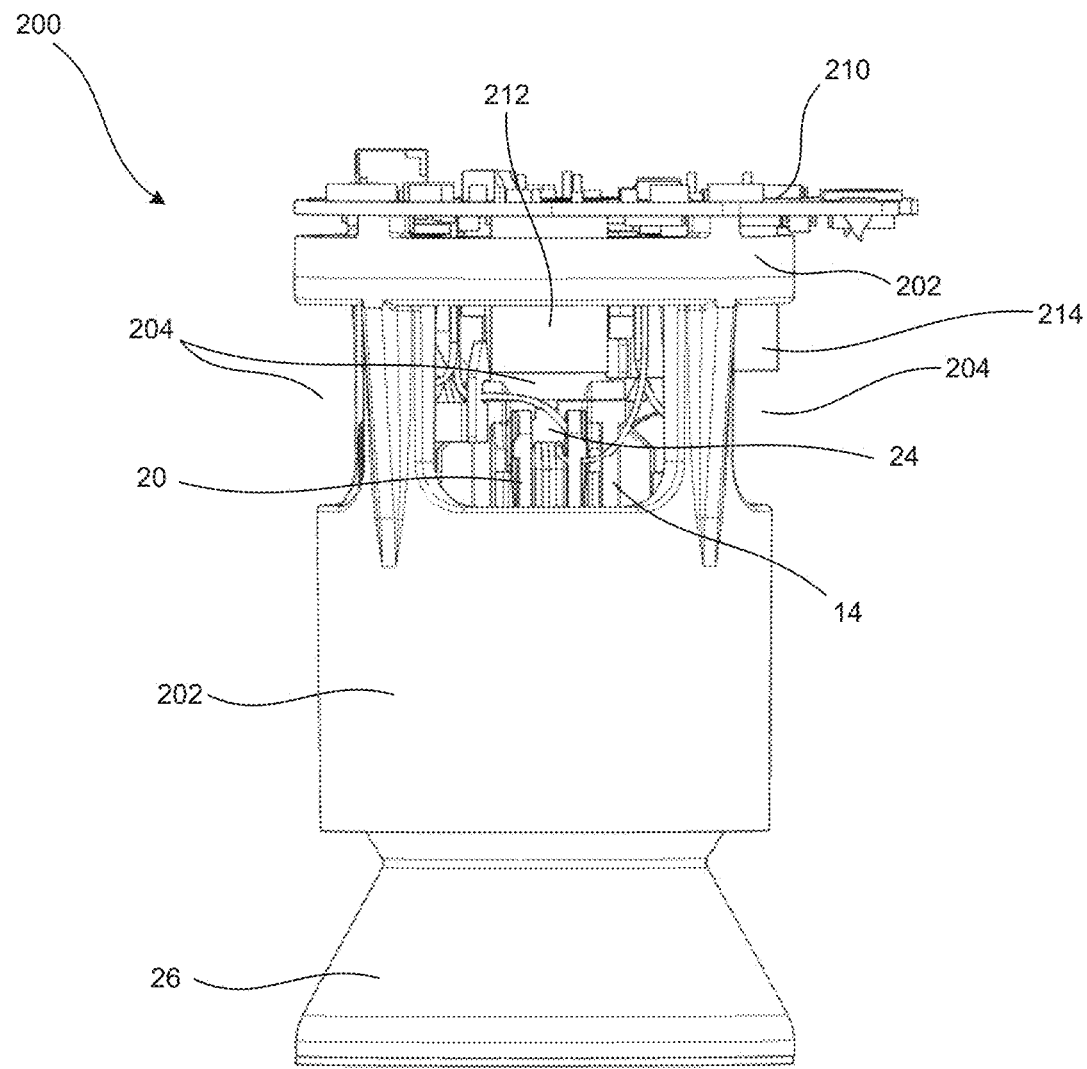
FIG. 3 shows an assembled compressor including the parts shown in FIG. 1.

FIG. 3 shows an assembled compressor 200 including the parts shown in FIG. 1. The compressor 200 comprises an outer can 202 which has a number of large air inlets 204 through which the compressor 200 draws air during use. A printed circuit board (PCB) 210 is mounted to an end of the outer can 202 proximate to the air inlets 204. This proximity of the PCB 210 to the cooling airflow being drawn into the compressor 200 helps to keep the PCB 210 and the electronic components mounted to it cool.

As can be seen from FIG. 3, a number of the larger electronic components for example those marked as references 212 and 214 are large enough to actually extend from the PCB into the air pathway for air entering the compressor 200 through the inlet 204, thus providing even better cooling thereto. These larger components may be components for which the improved cooling may be particularly beneficial, for example large capacitors, or heat sinks for electronic switches.

Whilst particular embodiments have thus far been described, it will be understood that various modifications may be made without departing from the scope of the invention as defined by the claims.

The invention claimed is:

1. A compressor comprising:
   a stator assembly comprising a plurality of stator elements;
   a rotor assembly comprising a shaft to which is mounted at least one bearing, a permanent magnet and an impeller;
   a support body; and
   an outer can comprising an air inlet;
   wherein the support body comprises a hollow elongate central part to which is mounted the at least one bearing, inside which the magnet is positioned, and at least a part of the stator elements are radially external to the hollow elongate central part, the elongate central part comprising a plurality of openings, and wherein the air inlet of the outer can and the plurality of openings in the elongate central part are each disposed on a surface that is parallel with respect to an axial direction of the shaft.

2. The compressor of claim 1, wherein the air inlet comprises at least one opening such that air enters the compressor in a direction having both axial and radial components.

3. The compressor of claim 1, wherein the outer can is spaced apart from the support body to form an annular airflow pathway.

4. The compressor of claim 3, wherein the stator elements are positioned with respect to the plurality of openings, and are fixed to the support body such that they are cooled by airflows on an inside and outside of the support body.

5. The compressor of claim 1, wherein a printed circuit board is mounted to an end of the outer can proximate the air inlet.

6. The compressor of claim 5, wherein one or more electric components mounted to the printed circuit board (PCB) extend from the PCB and into a space behind the air inlet.

7. The compressor of claim 1, wherein, in use, air flows through the compressor both inside the support body, and outside the support body.

* * * * *